Sept. 27, 1938.  P. A. KINZIE  2,131,050

RECIPROCATING GATE VALVE

Original Filed Feb. 8, 1933    5 Sheets-Sheet 3

Sept. 27, 1938.  P. A. KINZIE  2,131,050
RECIPROCATING GATE VALVE
Original Filed Feb. 8, 1933   5 Sheets-Sheet 4

Patented Sept. 27, 1938

2,131,050

UNITED STATES PATENT OFFICE 2,131,050

RECIPROCATING GATE VALVE

Phillip A. Kinzie, Denver, Colo., assignor to Universal Hydraulic Corporation, Denver, Colo., a corporation of Colorado Application February 8, 1933, Serial No. 655,803
Renewed October 22, 1937

16 Claims. (Cl. 251—56)

This invention relates to valves of the vertically reciprocating type wherein the stream flow therethrough is unimpeded when the valve element is at one extreme of its travel, and is entirely closed off at the other extreme of its travel, and more particularly to valves of such size and/or employed to control the flow of fluid under such pressures that it would be difficult or impracticable to control or operate them manually.

Valves such as contemplated by this invention are primarily intended for use under exceptionally severe operating conditions where heavy pressures are prevalent and relatively large quantities of fluid are to be controlled at high velocities of flow therethrough, in short to that field of service where conventional types of gate valves or slide gates or other similar equipment is inadequate.

Valves having a slidingly reciprocating leaf element provided with an aperture arranged to register with the fluid conduit when open, and so maintain a continuity of the water passage surfaces have been known and used for many years and that portion of this invention wherein similar construction is used is not claimed as new. Such gates have given good service under favorable conditions of operation, but, in the larger sizes where pressure intensities were increased, an excessive operating force was required to slide the leaf across the stationary seat members, and when movement was so produced, the abrasion upon the seating surfaces of both the stationary and moving parts caused by the heavy water loads was likewise excessive, producing a chattering action which in some cases was exceptionally severe, and detrimental to the valves and to the structures within which they were included. This condition became more acute as their sizes were increased.

To more clearly depict the possibilities of this invention, the following data are included in this application. The valve illustrated in the accompanying drawings is designed for an 86" diameter conduit under 300 pounds per square inch working pressure, and will be required to close when 3700 cubic feet per second of water are passing therethrough, at a velocity of 91 feet per second, i. e., to interrupt a flow of water which represents a total theoretical energy of more than 230,000 horsepower. When dealing with forces whose orders of magnitude are such as these, and when they are concentrated within such relatively small boundaries, the potential destructive capacities are difficult to visualize properly; and the design data applicable to the known type of sliding gate valves affords no satisfactory solution for equipment which is adequate to meet, control and guard forces of this order of magnitude.

The water pressure or load when closed upon the valve element operating under the stated conditions is approximately 2,000,000 pounds and, to insure an operating capacity capable of moving a known sliding gate valve under normal conditions, a coefficient of friction of 0.6 would be used in determining the lifting effort required, which would accordingly be 1,200,000 pounds. An operating mechanism of this capacity would be both cumbersome and costly, and the structural problems involved in uniformly distributing its reactions into the various parts far from simple. By employing the construction and principles of this invention, the maximum lifting effort required is estimated to be only 46,000 pounds, although the hoist provided and illustrated has been arbitrarily increased to deliver 100,000 pounds.

According to the present invention, the field of utility of this type of valve may be extended to the control of large quantities of water under high pressures such as the larger trunk mains in municipal water systems, in penstocks for generation of power, and, in general to installations in which it would be impracticable to apply those of the plain sliding type. This invention is not limited, however, to those fields of use in which the sliding gate is impractical, since it may be employed in any case where it is necessary or desirable to operate a reciprocating gate with a minimum force.

An object of the invention is to provide a reciprocating gate valve of an improved design which is suitable for large size valves and/or for valves controlling the flow of fluids under heavy pressures. An object of the invention is to provide a reciprocating type of valve wherein no sliding contact occurs between the mating stationary and moving seating surfaces when opening or closure of the valve is being effected. An object is to provide a valve of the reciprocating type wherein the opposing faces of the stationary and movable parts comprising the closing and sealing elements come into contact in a direction normal or perpendicular to those faces and in the same direction as the line of fluid flow, without any sidewise or rubbing motion between those faces at any time. An object is to provide a valve of the reciprocating type of such design and construction that it requires but a small fraction of the operating force employed in other valves to function. An object of the invention is to provide a valve of the reciprocating type wherein the members sealing the valve when closed against leakage will be tight against the highest pressures and will so remain through many years of service. A further object of the invention is to provide a valve of the reciprocating type wherein air is automatically supplied to the valve and associated conduit during the opening and closing cycles to reduce the erosion that normally occurs when the fluid flow is at such high velocities as to produce vacuum pockets at regions where there are abrupt changes in the outline or contours of the fluid passage. A further object of the invention is to provide a valve including a movable member supported upon rollers, and in which the slight distortion of the valve member produced by heavy water loads impressed upon it is automatically compensated so that the roller elements are uniformly loaded across the full length of their faces, and are thereby made more dependable and safe. More specifically, an object of the invention is to provide a valve of the reciprocating type which is adapted to the control of the flow of large quantities of water under high pressures and velocities, positively, safely and economically, and which may be actuated either by an electrically-driven mechanical hoist as illustrated in this application, by hydraulic cylinders wherein the pressure fluid is supplied by a power-driven pump, or by hydraulic cylinders supplied by pressure fluid either from the conduit upstream from the valve, or from any suitable independent source of supply.

A further object of the invention is to provide a valve of the reciprocating type wherein the power-driven operating mechanism is self-contained, and largely an integral cooperating part of the valve, of simple and rugged construction and is of but few parts economically supplied.

A further object of the invention is to provide a valve of the reciprocating type in which free and uninterrupted fluid flow is provided through the valve when open, with all parts of the conduit passage smooth and in unbroken continuity with that of the conduit on either side.

These and other objects and advantages of the invention will be apparent from the following specification when taken with the accompanying drawings, in which.

Before proceeding to a detailed description of this invention, particular attention is directed to the fact that, while the embodiment described and illustrated herein is for insertion in a pipeline or conduit, it can, by relatively slight alterations, be made to function particularly well upon the upstream or water face of high dams, where, mounted at the portals or entrances of sluiceways through the bases of such dam, or on the inlet ends of conduits of the largest size therethrough, it will function equally well under very high heads. In installations such as these, it would consist of a square or rectangular leaf member mounted upon the roller-trains on either side and including the wedge roller-train for placing the leaf member upon or withdrawing it from mating seating engagement with the stationary seat members without sliding, rubbing or abrasion thereof in the same manner as will be described in the embodiment of the invention as herein illustrated.

As indicative of the contemplated sizes and services in which this embodiment of the invention may be employed, certain applications of the novel valve constructions will be specified. The valve is adapted for use as a shut-off valve in a penstock adjacent to a turbine, as a stop-valve in a high-pressure trunk main in a city water supply system, as an emergency shut-off valve behind a needle valve, as a free discharge valve on the end of a pipe or conduit through a high dam or similar installation, and/or for the control of water or fluid flow in large quantities and under heavy pressures.

In the drawings, the reference numeral 1 identifies the bonnet cover which is arched in cross-section throughout its transverse length and is provided with bolted flanges upon its under side for making fluid-tight jointure with the opposing and mating upper face of the bonnet 2. The bonnet cover 1 provides a pedestal base in its middle length, to which the electric motor 3 is bolted, and its upper face at either end is formed into the bowl-shaped gear cases 4, one of which is shown in section in Fig. 3, in which view are also shown the worm gear 5, thrust bearings 6, and gear hub extension 7, whose upper end is contracted to threadably receive the stem 8 and thereby forms the lifting nut for its stem; it being understood that the parts just described are duplicated at the opposite end of 1. This sectional view also shows the stuffing-box with its gland 9 whereby the oil in gear case 4 is prevented from escaping therefrom around the lower gear hub, and the lower stuffing-box with its gland 10 whereby pressure fluid inside the bonnet and cover is prevented from escaping upwards around the stem 8. In this view it will be seen that the upper and lower stuffing-boxes just described are formed integrally with bonnet cover 1. Hand-holes 11 are provided to give access to glands 9 and 10. Oil-tight covers 12 on the gear cases 4 are provided with conically-shaped extensions 13 on their under sides, the lower faces of these resting against the upper faces of the top thrust bearings 6, and these receive the upthrust from the stems 8 and transmit it through the covers 12 to the bonnet cover 1 whenever the valve element is being closed, as will be described later. The motor 3 is provided with shaft extensions at its opposing ends which are connected by flexible couplings 14 to shaft extensions which are integral with worms, not shown, meshing with the worm gears 5.

Figure 2:
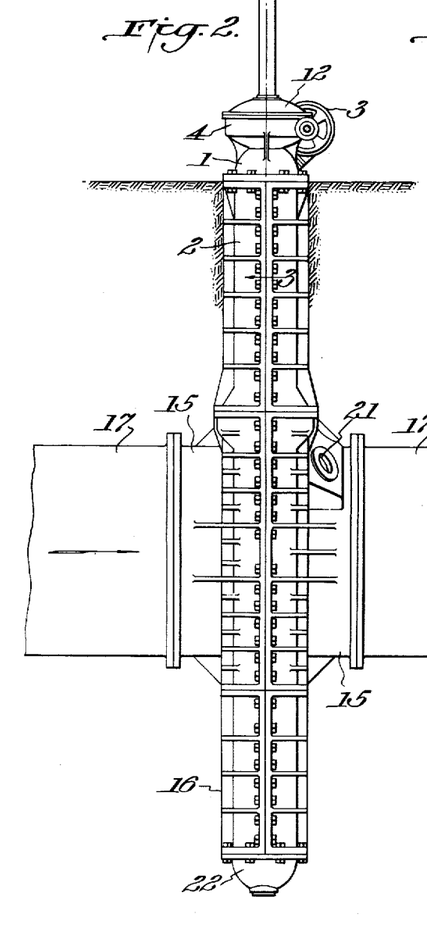
Fig. 2 is a side elevation thereof, wherein the line of fluid flow is from left to right.
Figure 7:
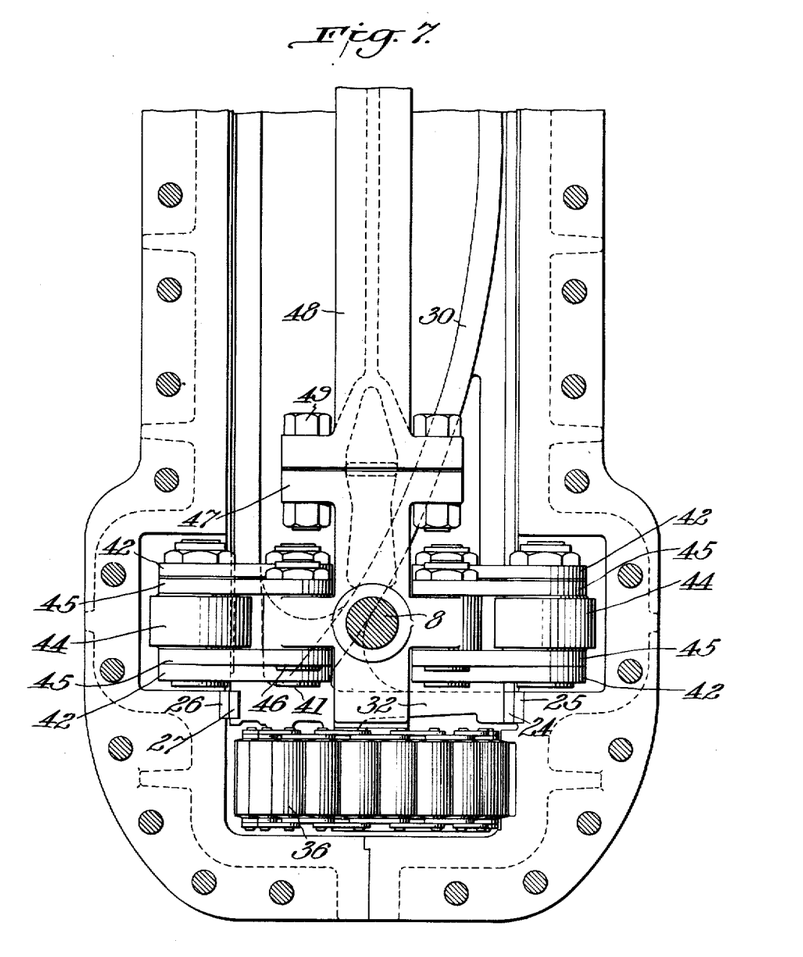
Fig. 7 is a fragmentary, but enlarged horizontal section taken substantially on line 7—7 of Fig. 6, but with some parts omitted to illustrate the toggle unit in plan.

Bonnet cover 1 and its hoisting equipment are held fast to the bonnet 2 which extends downwards, terminating in a flange face which is bolted in fluid-tight engagement with the mating upper flange face of valve casing 15. Bonnet 2 receives and envelops the valve element or leaf when the valve is open and is composed of two channel or C shaped castings when viewed from above, see Fig. 7, provided with vertical mating flanged faces which are bolted together to form fluid-tight joints. The two halves of the bonnet are symmetrical and surround a rectangular space to enclose the valve element when raised, the vertical plane of the joint faces of these flanges being at right angles to the line of fluid flow and coinciding with the center lines of the two stems 8, the gear cases 4 and of the bonnet cover 1. The valve casing 15 and the lower bonnet 16 are likewise each composed of upstream and downstream halves whose vertical mating flanged faces join in the same line and plane as that of the bonnet flanges, as may be seen in Fig. 2. Valve body 15 is provided with a cylindrical upstream extension terminating in a flanged face for connecting to the fluid conduit 17, and a similar extension downstream with a similar flanged face for connection to the fluid conduit 17 on that side. Midway of the stream flow length of casing 15 a vertical rectangular recess interrupts the continuity of the fluid passageway, this recess being rectangular in plan with its major length normal to the line of fluid flow and in alinement with and of the same dimensions as the rectangular space enclosed within in bonnet 2 and lower bonnet 16. It is within this recess that valve element or leaf 18 (Figs. 4, 5, 6, 7 and 8) reciprocates vertically, upwards to open the valve and downwards to effect closure.

Figures 5, 6:
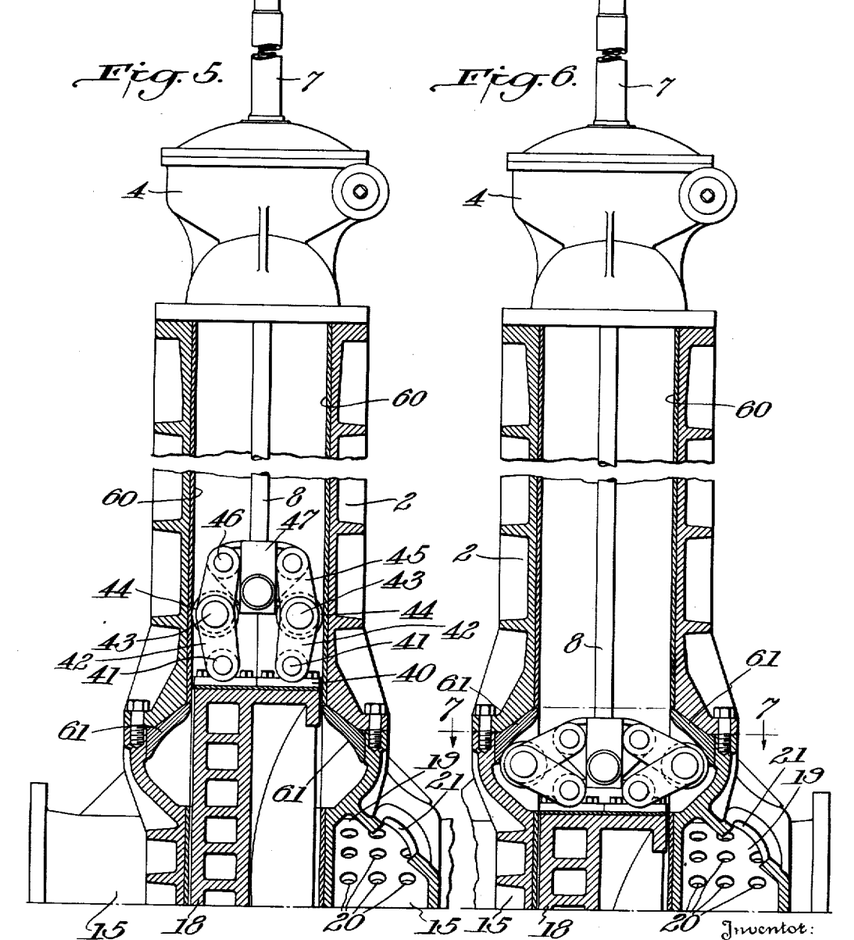
Fig. 5 is a vertical section taken through one side of the bonnet and upper portion of the conduit, taken substantially on line 5—5 of Fig. 1, and illustrating one of the toggle operating units in the position which it occupies near the end of the closing movement of the valve leaf.
Fig. 6 is a similar view illustrating the parts in their respective positions when the valve leaf is fully closed.

The downstream half of casing 15 is provided with a cored passage 19 surrounding the upper portion of the cylindrical wall forming the downstream fluid passageway, and an appropriate number of cored holes 20, Figs. 5 and 6, through this wall, provide communication between the fluid passageway 21 and cored passage 19, which communicates in turn with an air inlet manifold, not shown, through the three flanged openings 21. The manifold is connected by suitable piping to an automatic air valve, not shown, which admits air through the ports and passages described to the fluid passage whenever a negative pressure begins to develop therein adjacent to the downstream face of valve element 18 during its opening or closing movements. The air inlet valve may be of any appropriate design, but is preferably of the type described and claimed in my copending application, Ser. No. 649,222, filed December 28, 1932.

Lower bonnet 16 receives the lower portion of valve element 18 when lowered to the closed position, and its lower end terminates in a flanged face to which the head 22 is bolted in fluid-tight engagement.

The valve element or moving leaf 18 consists of a rectangular plate or casting having a cylindrical opening formed in its lower portion which registers with and forms continuity with the adjacent upstream and downstream fluid passageways in casing 15, when the valve is fully opened. The walls 23 defining this lower cylindrical opening or passage in the leaf 18 are of such axial length as to extend substantially to the adjacent cylindrical walls of the casing 15 when the valve is fully opened, thus avoiding eddies and turbulent flow through the valve.

Figure 8:
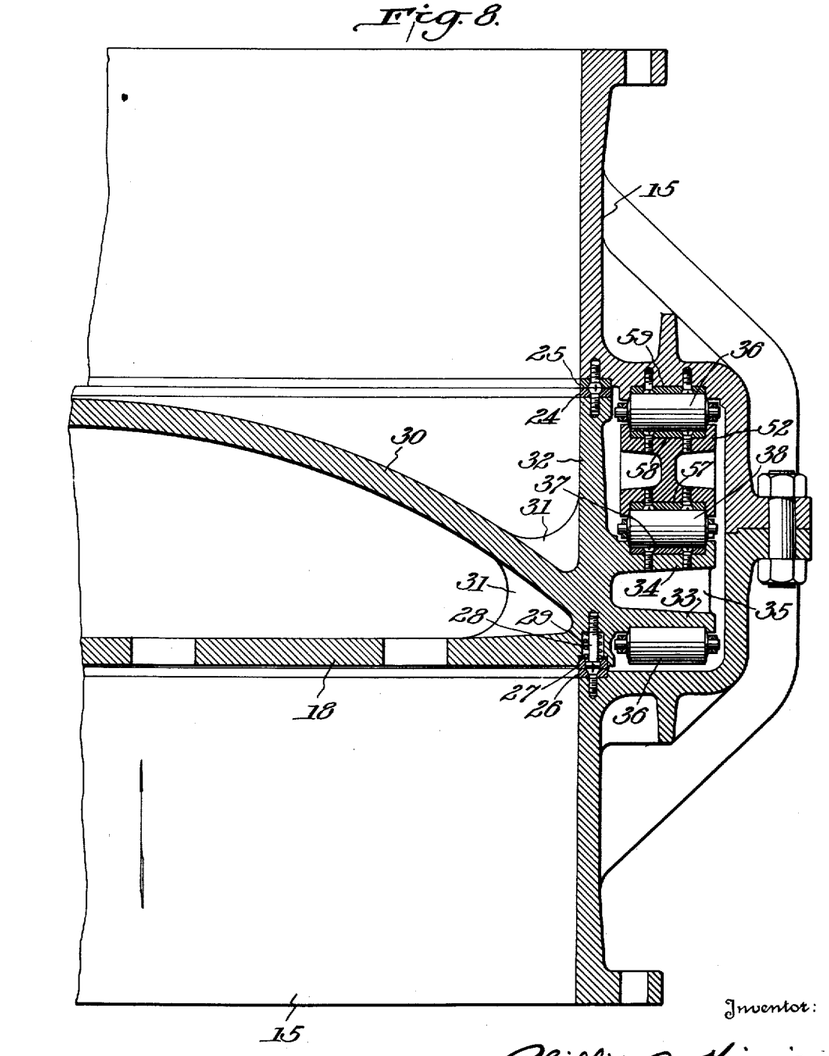
Fig. 8 is an enlarged, fragmentary section taken substantially on line 8—8 of Fig. 1.

The upper portion of the leaf 18 is carefully finished to receive and mount the seat ring 24 which is of non-corrosive metal and firmly fastened to valve element by countersunk screws. A similar stationary seat ring 25, Fig. 8, is attached in similar manner to the recess face of the downstream half of casing 15, by countersunk screws, while a complementary guide bar 26 is fastened to the upstream half of casing 15; it being understood that stationary seat ring 25 is mounted concentric with the axial center line of the fluid passageway through the valve, while the guide bars 26 stand vertically and equidistant from that same center line. The upstream face of valve element 18 is provided with vertical guide bars 27, Fig. 8, which are mounted on screws 28 and forced into constant sliding engagement with stationary guide bars 26 by springs 29. As shown in Fig. 8, it will be seen that the valve leaf is composed of a vertical membrane portion with cored holes therethrough and an arched or barrel vaulted downstream membrane portion 30 joined thereto throughout its vertical height, with the arch crown pointing downstream, and with its abutments and connections to the upstream membrane in continuous vertical alinement to form a span equal to the diameter of the fluid passageway through the valve. Spaced at equal vertical distances throughout the lengths of these abutments are heavy curved webs or reinforcing ribs 31 which extend between the vertical side walls 32 and the transverse plate and membrane 30. Vertical walls 32 extend downstream from the junctions of the vertical membrane and arch abutments to the plane of the finished surface upon which seat ring 24 is mounted, as may be seen in Fig. 8.

On either side of valve element and extending outward from its vertical side walls 32, in planes normal to fluid flow, are track members or rails 33 and wedge track members 34 which are joined by connecting ribs 35, alined with the ribs 31 on the interior faces of the side walls 32 to act in unison as cantilevers in resisting bending stresses produced by fluid pressures as will be explained later. The upstream sides of the roller tracks 33 are finished in a true vertical plane to guidingly receive the rollers 36 of the endless rollertrains which are arranged at each lateral edge of the valve element. The downstream faces of tracks 34 are machined on an inclined plane with respect to the finished surface of track 33, as shown in Fig. 4, so that the horizontal distances between these two surfaces are greater at the top of valve element 18 than that at the lower extremities of the tracks, and these inclined surfaces of tracks 34 are provided with non-corrosive, hardened metal facing members 37 to guidingly receive the rollers 38 of the wedge roller-trains.

The upper portion of valve element 18 terminates in a horizontal plane provided with finished pads 39 to boltingly receive the bottom toggle bearings 40 which are provided with pins 41 on which lower toggle links 42 are swingingly mounted. The upper ends of links 42 receive knuckle pins 43 on which are rotatably mounted toggle rollers 44 and the lower ends of toggle links 45, the upper ends of which are swingingly received upon pins 46 mounted in cross-head extensions 47 which are attached to the opposite ends of crosshead 48 by bolts 49. Cross head extensions 47 are each provided with vertical bosses tapped with acme threads of coarse pitch to receive the similarly threaded lower ends of hoist stems 8.

From this it will be seen that opening (upward) or closing (downward) movement of the valve element 18 is imparted to it from the hoist and stems through the cross-head and toggles, and that so long as the toggles are restrained in their collapsed or extended positions as shown in Fig. 5, the valve element, the toggles, the crosshead assembly and the stems will all move in unison and in equal amount in either direction.

Figures 3, 4A:
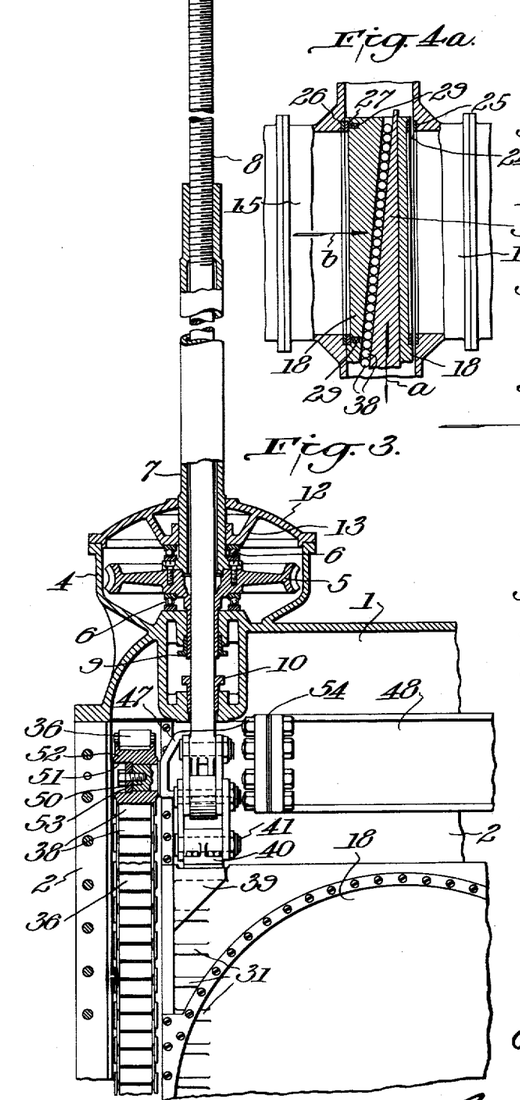
Fig. 3 is an enlarged vertical section taken on line 3—3 of Fig. 2, the valve leaf member being shown in elevation and in open position.
Fig. 4a is a diagrammatic view illustrating the mode of operation of these parts.
Figure 4:
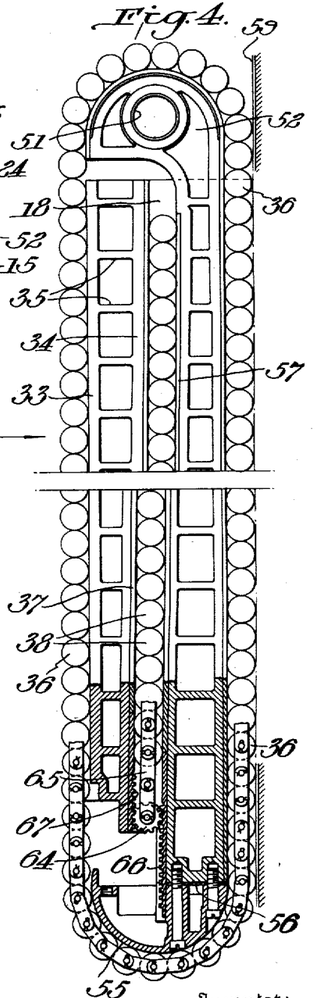
Fig. 4 is a side view of the carriage and valve leaf, with parts shown in section, and of the roller trains which carry the same.

As shown in Fig. 3, the crosshead extensions 47 terminate in cylindrical portions 50 forming shouldered trunnions which are received in the matingly bored hole 51, Fig. 4, in the upper ends of the roller carriages 52 upon which the endless roller-trains 36 are mounted. There is one roller carriage at each side of the valve, and the carriages are firmly secured upon the opposite crosshead extensions 47 by retaining collars 53 which are bolted to the trunnions 50 and bear against shoulders formed by counterboring the openings 51 from their outer faces. Shims 54 are inserted between one or both of the crosshead extensions 47 and the crosshead 48 to adjust the spacing of the extensions 47 to prevent any bending or binding of the stems 8 when the latter are raised or lowered to operate the valve.

With the described connections, it is obvious that the roller carriages are rigidly connected through the crosshead 48, and that the carriages and crosshead move up and down with the stems 8 when the motor 3 is operated to rotate the gear hub extensions 7.

Each roller carriage 52 is provided with a semi-circular bottom end piece 55 bolted thereto, with adjusting shims 56 provided between the opposing end faces to provide the proper tension in the endless roller-trains. From Fig. 4 it will be seen that each roller carriage 52 and its bottom end piece 55 together resemble a tall and very narrow letter C reversed, and that these parts together with the outside face of track member 33, which is an integral part of the valve element, constitute the raceway upon which the endless train of rollers 36 is mounted, and around which they travel whenever the gate stems 8 are moved vertically in either an upward or downward direction. By reference to Fig. 8, it will be seen that the intermediate portion of the roller carriage resembles the letter H in cross section and that the surfaces of the two parallel outer faces constituting the legs of the H have been machined to receive facing members 57 and 58, which are held thereto by countersunk screws. Facing member 57 guidingly receives the rollers 38 of wedge roller-train, and facing member 58 guidingly receives the rollers 36 of endless roller-train. These facing members are of hardened non-corrosive metal and are finished accurately to insure full face contact of the rollers contacting them so that they will safely carry the heavy loadings imposed upon them, as will be explained hereafter. In the downstream half of gate casing 15, a facing member 59 is placed for engaging the faces of rollers 36 opposite those contacted by the facing member or track 58. Facing member 59 extends vertically throughout the entire height of body 15 and registers with similar members above in bonnet 2 and in lower bonnet 16.

Turning again to Fig. 8, which is a horizontal section upon the center line of the valve with the valve in the closed position, it will be seen that the fluid pressure upon the upstream face of the valve element 18 is carried to the vertical walls 32 and from thence to the cantilever formed by the laterally extending members 33, 34 and 35 which rest upon rollers through which the load is transferred through track 57 to the carriage 52, then through the track 58 to rollers 36 through which in turn it is transferred to track 59, and from thence into the downstream half of casing 15, which is embedded in concrete. This load may be very heavy and in order that it may be successfully and safely transferred through the various members just enumerated, it is essential that it be evenly distributed across the face widths of the trains of rollers. With loadings as heavy as are here encountered, and concentrated in such small confines, it is obvious that however strong and rugged the parts may be, there necessarily will be some appreciable deflection which would seemingly make even or uniform load distribution difficult or impracticable. To overcome this obstacle the H section of roller carriage 52 is made with the middle portion or cross bar joining the two legs of the stem of such proporitons as to be amply strong, acting as a column, to transfer the load from rollers 38 to rollers 36, and yet at the same time be sufficiently flexible as to permit complementary deflection of the two legs of the H so that they reflect and parallel the deflectional distortion in the lateral flange 34 and in valve element 18, and thereby maintain practically uniform load distribution across the faces of the rollers.

The upstream and downstream halves of bonnet 2, Figs. 5 and 6, are each provided with vertically disposed roller bars 60 which are rollingly engaged by toggle rollers 44, thereby maintaining the toggles in the collapsed or extended position shown in Fig. 5 until the rollers reach the lower extremities of bars 60 and, following the mutually expanding curves of inserts 61, the toggles expand sidewise and simultaneously shorten vertically until they ultimately attain the positions illustrated in Fig. 6. Bars 60 are finished and are composed of non-corrosive metal, as are inserts 61 which are hardened in order that they may safely carry the heaviest reactions imposed upon them by the toggles.

Figure 1:
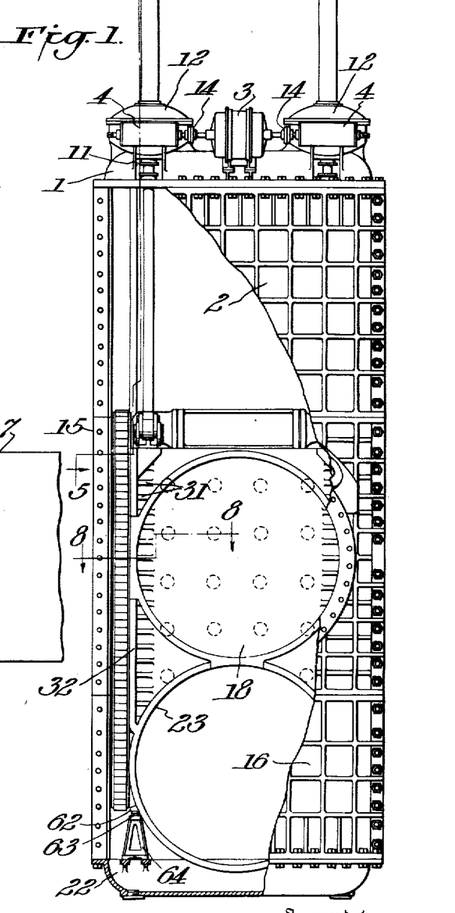
Fig. 1 is a downstream elevation of one embodiment of the invention, part of the case being broken away to show the valve in closed position.

When the toggles have assumed the positions shown in Fig. 6, the valve element 18 is then in its lowermost position and the valve is tightly closed, and in order that further downward movement of the valve element may be prevented, a ribbed shelf 62, Fig. 1, is provided on the opposite sides of its cylindrical lower portion. The under faces of these ribbed shelves are finished and engage mating buffer plates 63 which rest upon stop brackets 64, the buffer plates having a limited vertical movement to compress rubber buffers, not shown, to absorb the shock when the downward movement of the leaf is arrested by the engagement of the shelf 62 and buffer plates 63.

So long as the toggle mechanisms are maintained in their extended or collapsed positions by their rollers riding against the roller bars 60, any movement in either an upward or a downward direction of stems 8 is reflected in equal amount simultaneously by the crosshead 48, crosshead extensions 47, all the crosshead mechanisms, valve element 18, and roller carriages 52, while the endless roller-trains, carrying the imposed water load transmitted to them from the upstream side of the valve element, roll along upon the supporting faces of track members attached to the downstream half of valve body, at one-half the speed of the stems and other moving parts, and in the same direction. This condition continues in downward movement of the parts enumerated until such time as the toggle rollers reach the bottom extremities of roller bars 60 and run onto the oppositely expandingly curved surfaces of inserts 61 at which time they begin to expand as previously described, while the valve element ceases further downward movement by virtue of the engagement of its stops 62 with the stop plates 63 which now hold it stationary. Continued downward movement of the stems is now accompanied by similar and equal movement of the crosshead, crosshead extensions and the roller carriages mounted thereon, this further downward movement of these parts being accommodated with respect to the now stationary valve element by the expansion of the toggles and their consequent vertical shortening. As the carriages and their roller-trains then roll along beneath the valve element, the wedge roller-train 38, Fig. 4, rolls down the inclined plane of the facing members 57 attached to the carriage, with a velocity which is one-half that of the carriage, and simultaneously rolls down the parallel and complementary inclined plane of facing members 37 which are attached to valve element 18, for a distance which is equal to one-half that which the carriage makes with respect to the valve element. For this embodiment of the invention as illustrated, the carriage moves downward 8⅞ inches farther than the valve element, and the taper of the inclined planes on the two parts mentioned is such that this 8⅞ inches downward travel of the carriage is accompanied by a right-angled downstream movement of the valve element of 9/32 inch, or, expressing this in another way, the carriage in moving downward 8⅞ inches after the valve element has come to rest on its stops, permits the valve element to move downstream axially with respect to the conduit and the valve center line for a distance of 9/32 inch. This horizontal movement of the valve element 18 bring its seat ring 24 into seating engagement with the complementary seat ring 25 in the valve body 15, and the fluid pressure on the upstream side of the valve element forces these surfaces into fluid-tight engagement, and the entire load so produced is transferred from the valve element through the seat rings directly into the downstream half of the valve body. From this it will be seen that the valve element is seated without any sliding or dragging effect whatever occurring between any of the moving parts, and that when it has been so seated, the roller-trains and the wedge roller-trains are relieved of all pressure loads now acting upon the valve element.

In order to accommodate the relative movements of the wedge roller-trains 38 with respect to both the inclined track 57, on the carriage 52 and the complementary inclined track 37 on the valve element, and still maintain the wedge roller-trains constantly synchronized and correctly positioned vertically with respect to both of these surfaces under all conditions, a pinion 64 is mounted at the bottom end of each of the wedge roller-trains, between the side bars 65 which are each continuous throughout the vertical height of these trains and between which the rollers 38 are mounted. The pitch diameter of these toothed pinions is the same as the diameter of the rollers 38 and their teeth simultaneously engage the teeth of racks 66 which are bolted to the carriages, and the racks 67 which are bolted to the valve element.

The pinions consequently rotate with the same angular velocity as the rollers, and being in toothed engagement with the complementary racks, maintain their respective roller-trains in their proper positions relative to both the valve element and the two carriages.

When the valve is closed and the opening cycle begins, the stems draw the carriages upward and the inclined planes thereon gradually force the wedge roller-trains engaged therewith to move the valve element in an upstream direction axially with respect to the horizontal center line of the valve and that of the fluid conduit as well, so that the valve element is moved away from engagement with its seat prior to the time that it first begins to move vertically, and in consequence, the opening of the valve and its closing as well is all accomplished without any sliding action occurring between the working surfaces at any time, and inasmuch as the entire cycle of movement is accomplished through the agency of the rollers, the force required is greatly reduced, and the sealing members are protected from abrasion or wear.

The mode of operation is illustrated diagrammatically in Fig. 4a, in which, for greater clearness of illustration, the parts are not shown in the same relative sizes as in the other views. The valve element 18 and carriage 52 are shown in the positions which they occupy when the carriages have been lowered to that position which brings the sealing elements on the casing and the valve member into axial alinement. Further movement of the operating mechanism displaces the carriage downward, as indicated by arrow a, but there is no further downward movement of the valve member. Due to the inclination of the tracks along which rollers 38 travel, the downward movement of the carriage removes the support previously provided for the valve member and it is forced downstream, as indicated by arrow b, to carry the sealing ring 24 into firm engagement with the sealing ring 25 on the valve casing.

Upon opening movement of the valve, the inclined track on the carriages wedges the valve element away from the casing during the initial upward movement of the carriages 52.

As previously stated, the invention is not restricted to any particular size of valve, but provides reciprocating valves that are adapted for use under any conditions in which manual opening or closing of the valve is either impracticable or impossible. It will, therefore, be understood that the invention is not restricted to the specific embodiment herein illustrated and described, and that changes may be made in the several elements, their relative size, shape and relationship without departure from the spirit of my invention as set forth in the following claims.

I claim:

1. A reciprocating valve comprising a housing with a throughway providing an inlet and outlet, the latter having a valve seat, a reciprocable gate element movable transversely of the throughway for closing and opening the same and movable axially thereof for seating and unseating during absence of transverse movement, a movable carriage at each side of the gate element carrying continuous roller trains reducing friction and transferring gate loading to said housing, cooperating inclined surfaces on the gate element and carriages intermediate the runs of each roller train and arranged in relation thereto to move the gate element axially of the throughway for seating and unseating, roller trains intermediate the cooperating inclined surfaces and synchronized with the movement of the carriages whereby friction is reduced and the movable parts maintained in predetermined relation at extremes of travel, and means arresting transverse movement of the gate element during closing in advance of the limit of travel of said carriages.

2. A reciprocating valve comprising a housing with a throughway providing an inlet and outlet, the latter having a valve seat, a reciprocable gate element movable transversely of the throughway for closing and opening the same and movable axially thereof for seating and unseating during absence of transverse movement, an open center movable carriage at each side of and accommodating the gate element therein and each provided with a continuous roller train circumscribing its respective carriage and the gate element, said roller trains reducing friction and transferring gate loading to said housing, cooperating inclined surfaces on the gate element and carriages intermediate the runs of each roller train and arranged in relation thereto to move the gate element axially of the throughway for seating and unseating, roller trains intermediate the cooperating inclined surfaces and synchronized with the movement of the carriages whereby friction is reduced and the movable parts maintained in predetermined relation at extremes of travel, and means arresting transverse movement of the gate element during closing in advance of the limit of travel of said carriages.

3. In a gate valve, a gate housing with a fluid passageway therethrough, a gate member within the housing movable transversely of the passageway and of sufficient dimension with respect thereto such that there is always on one side or the other in the open or closed position thereof a supporting and guiding length of gate member at least equal to the dimension of the gate opening, gate member operating means including inclined plane means moving the gate member axially of the passage for seating and unseating the gate member, and means counteracting any tendency of the gate to move upwardly on the inclined plane means due to pressure on the gate member.

4. In combination with a gateway, a drop gate member seating therein, cooperating inclined plane means for moving the gate member from a seated position while under pressure in advance of opening movement, suspension means initiating the movement along the inclined plane means from the seated position and for accomplishing opening and closing travel of the gate member, and means positively controlling the movement of said gate on the inclined plane means as pressure builds up on one side thereof.

5. In combination with a gateway, a gate unit movable transversely of the way and including relatively movable parts one of which is a gate leaf, inclined plane means between the leaf and complementary parts for seating and unseating the gate leaf, and gate opening and closing mechanism including cooperating means positively controlling the relative movement of the gate leaf and other gate unit parts for opening and closing movements of said unit.

6. In combination with a gateway, a gate unit movable transversely of the way and including relatively movable parts one of which is a gate leaf, inclined plane means between the leaf and complementary parts for seating and unseating the gate leaf, and gate opening and closing mechanism including multiple cooperating means disposed at opposite sides of said gateway relating the relative movement of the gate leaf and other gate unit parts to equally distribute the gate raising effort and positively control the relative movement of said leaf and complementary parts as pressure builds up on one side of said leaf.

7. In combination with a housing providing a gateway, a gate unit movable transversely of the way and including relatively movable parts one of which is a gate leaf, inclined plane means between the leaf and complementary parts for seating and unseating the gate leaf, and gate opening and closing mechanism including multiple cooperating synchronized means at opposite sides of said gateway relating the relative movement of the gate leaf and other gate unit parts to equally distribute the gate raising effort and cooperating with said housing to control the relative movement between said leaf and complementary parts as pressure builds up on one side of said leaf.

8. In combination with a gateway, a gate unit movable transversely of the way and including relatively movable parts one of which is a gate leaf, inclined plane means between the leaf and complementary parts for seating and unseating the gate leaf, and opening and closing mechanism including cooperating means squaring the gate leaf and positively controlling the relative movement of the gate leaf and other gate unit parts in all positions of said leaf irrespective of pressure thereon.

9. In combination with a gateway, a drop gate member seating therein and movable transversely thereof into open and closed positions, said gate member having cooperating inclined plane means for moving the gate member into and from a seated position while under pressure, means for imparting transverse movement to said gate member and means positively determining the relation of said cooperating inclined plane means throughout the transverse movement of said gate member.

10. In combination with a gateway, a drop gate member seating therein and movable transversely thereof into open and closed positions, said gate member having cooperating inclined plane means for moving the gate member into and from a seated position while under pressure, means for imparting transverse movement to said gate member and means counteracting the lifting force on said gate member when subjected to unbalanced pressures on opposite sides thereof.

11. In combination with a gateway, a gate unit movable into open and closed positions transversely of the gateway and including a gate leaf and cooperating parts relatively movable along inclined planes for seating and unseating said gate leaf, means suspending said gate unit comprising independent means connecting with said gate leaf and with said relatively movable cooperating parts for opposing a lifting force exerted on said leaf due to unbalanced pressures on opposite sides thereof.

12. In combination, a gateway and a gate leaf seating therein, a carriage on which said gate leaf is movable into open and closed positions transversely of said gateway, said gate leaf and carriage being relatively movable to seat and unseat said leaf, and means suspending said gate leaf through a jointed connection with said structure.

13. In combination, a gateway and a gate leaf seating therein, a carriage on which said gate leaf is movable into open and closed positions transversely of said gateway, said gate leaf and carriage being relatively movable to seat and unseat said leaf, means suspending said carriage structure, and a jointed connection between said gate leaf and said carriage whereby a downward thrust is imposed on said gate leaf sufficient to overcome a lifting force on the leaf due to unbalanced pressure conditions on opposite sides thereof.

14. In a gate valve, a gate housing with a fluid passageway therethrough, a gate member within the housing movable transversely of the passageway, gate member operating means including inclined plane means moving the gate member axially of the passage for seating and unseating the gate member, and means counteracting any tendency of the gate to move upwardly on the inclined plane means due to pressure on the gate member.

15. In a gate valve, a gate housing with a fluid passageway therethrough, a gate member within the housing movable transversely of the passageway, gate member operating means including inclined plane means moving the gate member axially of the passage for seating and unseating the gate member, and means including a toggle for counteracting any tendency of the gate to move upwardly on the inclined plane means due to pressure on the gate member.

16. In a gate valve, a gate housing with a fluid passageway therethrough, a gate member and a carriage therefor within the housing movable transversely of the passageway, gate member operating means including inclined plane means between the carriage and the gate member for controlling movement of the gate member axially of the passage for seating and unseating, toggle means connecting said carriage and said gate for limited relative movement, and means limiting said toggle means in different degrees at different positions of gate member movement.

PHILLIP A. KINZIE.

CERTIFICATE OF CORRECTION.

Patent No. 2,131,050. September 27, 1938.

PHILLIP A. KINZIE.

It is hereby certified that error appears in the printed specification of the above numbered patent requiring correction as follows: Page 6, second column, line 74, claim 12, before the word "structure" insert carriage; and that the said Letters Patent should be read with this correction therein that the same may conform to the record of the case in the Patent Office.

Signed and sealed this 20th day of December, A. D. 1938.

Henry Van Arsdale (Seal) Acting Commissioner of Patents.